(12) United States Patent
Ono

(10) Patent No.: US 7,045,715 B2
(45) Date of Patent: May 16, 2006

(54) FIXING DEVICE FOR WIRE HARNESS

(75) Inventor: Shuji Ono, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 25 days.

(21) Appl. No.: 10/488,100

(22) PCT Filed: Oct. 16, 2002

(86) PCT No.: PCT/JP02/10711

§ 371 (c)(1),
(2), (4) Date: Mar. 8, 2004

(87) PCT Pub. No.: WO03/033309

PCT Pub. Date: Apr. 24, 2003

(65) Prior Publication Data

US 2004/0238204 A1 Dec. 2, 2004

(30) Foreign Application Priority Data

Oct. 16, 2001 (JP) ............................. 2001-318051

(51) Int. Cl.
*H01B 7/00* (2006.01)
(52) U.S. Cl. ................ 174/72 A; 174/135; 174/138 G; 248/73; 248/71
(58) Field of Classification Search .............. 174/72 A, 174/135, 138 G; 248/73, 71, 68.1, 74.2
See application file for complete search history.

(56) References Cited

U.S. PATENT DOCUMENTS

| | | | | | |
|---|---|---|---|---|---|
| 4,369,947 | A | * | 1/1983 | Kuwano | 248/74.2 |
| 4,811,922 | A | * | 3/1989 | Yoneyama | 248/73 |
| 4,918,261 | A | * | 4/1990 | Takahashi et al. | 174/135 |
| 6,417,451 | B1 | * | 7/2002 | Uchiyama | 174/72 A |
| 6,641,093 | B1 | * | 11/2003 | Coudrais | 248/73 |

* cited by examiner

*Primary Examiner*—Jinhee Lee
(74) *Attorney, Agent, or Firm*—Armstrong, Kratz, Quintos, Hanson & Brooks, LLP

(57) ABSTRACT

It is an objective of the present invention to provide a wiring harness fixing device, by which a wiring harness can be easily removed from a panel of a motor vehicle and the saving of resources can be attained. A wiring clip as the wiring harness fixing device fixes a wiring harness on a panel. The wiring clip includes a mount and an engaging part. The mount has a flat plate-shape. The engaging part includes a standing piece standing up from the mount, a pair of engaging pieces, a thin part, and a thick part. The pair of engaging pieces has a mountain-shape, in which one end thereof continues to an end of the standing piece. The thin part is formed concave from an outer surface of the standing piece and has the minimum cross-sectional area in the standing piece. The thick part protrudes from the outer surface of the standing piece. The thin part is situated nearer to the mount than the thick part is situated near the mount.

5 Claims, 4 Drawing Sheets

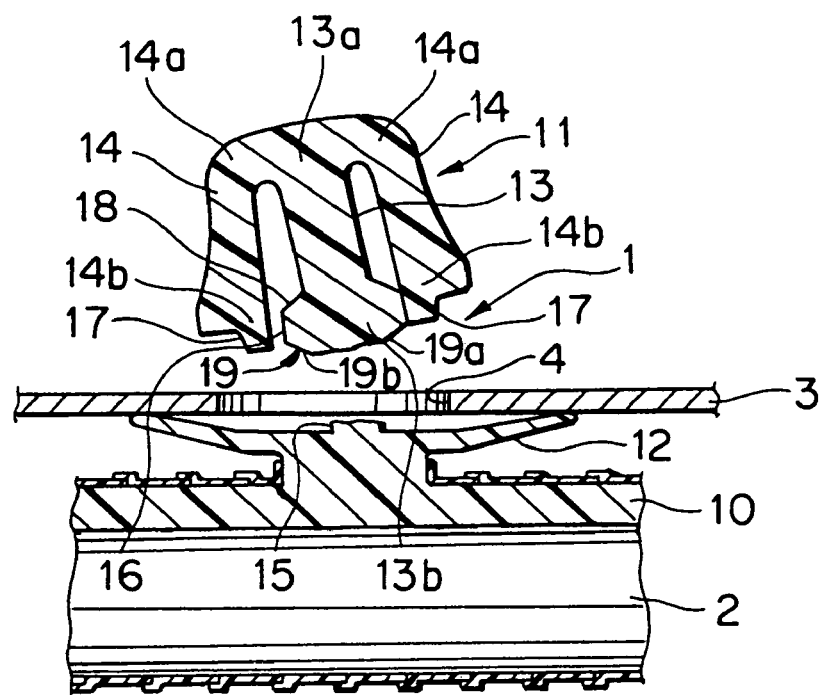
F I G. 6

FIXING DEVICE FOR WIRE HARNESS

TECHNICAL FIELD

The present invention relates to a wiring harness fixing device for fixing a wiring harness on a panel which constitutes a vehicle body of a motor vehicle and so on as a vehicle.

BACKGROUND ART

Various electronic instruments are mounted on a motor vehicle as a vehicle. The motor vehicle is provided with a wiring harness which transmits electric power from an electric source such as a battery and transmits control signals from control devices to the electronic instruments. The wiring harness includes a plurality of electric wires (hereinafter, wires) and connectors attached to ends and so on of the wires.

Each wire is a so-called coated wire which includes an electrically conductive core wire and an electrically insulating coating that coats the core wire. Each connector includes terminal fittings, each of which is electrically connected to the core wire of the wire, and an insulating connector housing which receives the terminal fittings. The connector is to be coupled with a connector of the electronic instrument. Thus, the wiring harness transmits the electric power and various signals to the electronic instruments.

For example, as shown in FIG. 7, a wiring harness fixing device 101 is used to fix a wiring harness 107 on a panel 100 that constitutes a vehicle body of a motor vehicle. The wiring harness fixing device 101 integrally includes a flat plate-shaped mount 102 and an engaging part 103. The wiring harness fixing device 101 is made of synthetic resin.

The engaging part 103 integrally includes a standing piece 104, which stands up from the mount 102, and a pair of engaging pieces 105. The engaging pieces 105 continue to each other at an end thereof. The end of the pair of engaging pieces 105 continues to the tip of the standing piece 104, the tip being away from the mount 102. Opposite ends of the respective engaging pieces 105 are away from each other having a distance therebetween and having a distance from the standing piece 104.

Each engaging piece 105 gradually approaches toward the mount 102 as extending from the one end to the opposite end. The engaging pieces 105 gradually parts from each other and from the standing piece 104 as extending from the one end to the opposite end. The pair of the engaging pieces 105 is formed in a mountain-shape from a side view thereof. Each opposite end of the pair of the engaging pieces 105 is provided with a notch 106. The notch 106 is formed by notching an outer edge of the opposite end of the corresponding engaging pieces 105. The pair of the engaging pieces 105 can be elastically deformed in a direction that the opposites ends of the pair of the engaging pieces 105 approach toward each other.

The wires of the wiring harness 107 are put on the mount 102 and a tape 108 is wound up on the outer circumference of the mount 102 and the wires, thereby the wiring harness fixing device 101 is fixed to the wiring harness 107.

Then, the pair of the engaging pieces 105 is inserted into a hole 109 formed in the panel 100. The pair of the engaging pieces 105 is once elastically deformed in a direction that the opposites ends of the pair of the engaging pieces 105 approach toward each other. Thereafter, when each opposite end of the pair of the engaging pieces 105 is inserted into the corresponding hole 109, the opposite ends of the pair of the engaging pieces 105 is displaced in a direction that the opposites ends of the pair of the engaging pieces 105 part away from each other by an elastic recovering force. Then, the notch 106 comes in contact with an inner edge of the hole 109. Thus, the engaging part 103 is engaged with the hole 109 formed in the panel 100. Thus, as shown in FIG. 7, the wiring harness fixing device 101 fixes the wiring harness 107 on the panel 100.

When the wiring harness 107 fixed on the panel 100 with the wiring harness fixing device 101 is removed from the panel 100, an end of the wiring harness 107 is displaced in a direction of moving away from the panel 100 along an arrow K shown in FIG. 8. Then, the tape 108 is cut as shown in FIG. 9, thereby the wiring harness 107 is removed from the panel 100.

In the wiring harness fixing device 101, the tape 108 is cut so as to remove the wiring harness 107 from the panel 100. Therefore, the wiring harness 107 must be displaced in a direction of moving away from the panel 100 causing a problem for a worker that the wiring harness 107 is hard to be removed from the panel 100.

Further, in the wiring harness fixing device 101, even if the wiring harness 107 is removed from the panel 100, the engaging part 103 is still engaged with the hole 109 of the panel 100, that is, still attached on the panel 100. Since the engaging part 103 is engaged in the hole 109 of the panel 100, it is difficult to remove the wiring harness fixing device 101 from the panel 100. That is, it is difficult to easily remove the wiring harness fixing device 101 from the panel 100 of a motor vehicle that becomes unnecessary. Such a situation is undesirable from the viewpoint of saving of resources.

It is therefore an objective of the present invention to provide a wiring harness fixing device, by which a wiring harness can be easily removed from a panel of a motor vehicle and the saving of resources can be attained.

DISCLOSURE OF INVENTION

The present invention is a wiring harness fixing device for mounting a wiring harness on a panel that constitutes a body of a motor vehicle, comprising:

a mount to be put on the wiring harness;

an engaging part, which stands up from the mount and can engage with a hole formed in the panel;

a thin part, which is provided at an end of the engaging part on the side of the mount and has the smallest cross-sectional area in the engaging part, said cross-sectional area being taken along an extending direction of the wiring harness; and displacement means for displacing the engaging part in a direction of inclining the engaging part toward the mount around the thin part when the mount is displaced along the extending direction of the wiring harness.

That is, when the mount is displaced in the extending direction of the wiring harness, the displacement means displaces the engaging part in the direction of inclining the engaging part toward the mount. Then, the engaging part is broken from the thin part, at which the cross-sectional area of the engaging part is minimum. That is, the engaging part is cut at the thin part.

Thus, when the mount is displaced in the extending direction of the wiring harness, the engaging part is separated. Therefore, when the mount is displaced in the extending direction of the wiring harness, the mount and the wiring harness can be removed from the panel. That is, when the wiring harness is removed from the panel, the mount is also removed from the panel.

Further, in the present invention, the displacement means is provided at an end of the engaging part on the side of the mount and the thin part is situated nearer to the mount than the displacement means is situated near the mount.

That is, the thin part is situated nearer to the mount than the displacement means is situated near the mount. Therefore, when the displacement means inclines the engaging part toward the mount, the engaging part is securely broken from the mount. That is, when the mount is displaced in the extending direction of the wiring harness, the mount and the wiring harness can be securely removed from the panel. That is, when the wiring harness is removed from the panel, the mount is also securely removed from the panel.

Further, in the present invention, the engaging part includes;

a standing piece standing up from the mount; and a pair of engaging pieces, which engages with the hole formed in the panel, continues to an end of the standing piece on the opposite side of the mount, and is inclined in a direction of moving away from each other as the pair of engaging pieces approaches toward the mount, wherein the thin part and the displacement means are provided at an end of the standing piece on the side of the mount, the thin part has the smallest cross-sectional area in the standing piece, said cross-sectional area being taken along an extending direction of the wiring harness, and the displacement means protrudes from an outer surface of the standing piece toward an outer direction of the standing piece.

That is, the displacement means protrudes from the outer surface of the standing piece. Therefore, when the mount is displaced along the extending direction of the wiring harness, the engaging pieces do not approach the standing piece to come in contact with the standing piece. That is, the displacement means securely displaces the engaging part in the direction of inclining the engaging part.

Further, in the present invention, the displacement means includes a first inclined surface, which protrudes from the outer surface of the standing piece toward the outer direction of the standing piece and is inclined in a direction of gradually approaching toward the outer surface of the standing piece as the first inclined surface moves away from the mount.

That is, when the mount is displaced in the extending direction of the wiring harness, the displacement means displaces the engaging part in the direction of inclining the engaging part toward the mount. Then, the engaging part is broken from the thin part, at which the cross-sectional area of the engaging part is minimum. That is, the engaging part is cut at the thin part.

Therefore, when the mount is displaced in the extending direction of the wiring harness, the mount and the wiring harness can be more securely removed from the panel. That is, when the wiring harness is removed from the panel, the mount is also more securely removed from the panel.

Further, in the present invention, the displacement means includes a second inclined surface, which is provided between the first inclined surface and the thin part, protrudes from the outer surface of the standing piece toward the outer direction of the standing piece, and is inclined in a direction of gradually advancing toward the outside of the standing piece as the second inclined surface moves away from the mount.

That is, the second inclined surface is situated nearer to the thin part than the first inclined surface is situated near the thin part. The second inclined surface is inclined in a direction of gradually advancing toward the outside of the standing piece as the second inclined surface moves away from the mount. Therefore, when the mount is displaced along the extending direction of the wiring harness, the displacement means more securely inclines the engaging part toward the mount.

Therefore, when the displacement means inclines the engaging part toward the mount, the engaging part is more securely broken from the mount. That is, when the mount is displaced in the extending direction of the wiring harness, the mount and the wiring harness can be more securely removed from the panel. That is, when the wiring harness is removed from the panel, the mount is also more securely removed from the panel.

BRIEF DESCRIPTION OF THE DRAWINGS

FIG. 6 is a cross-sectional view illustrating a state when the engaging part of the wiring clip is separated from the mount from the state shown in FIG. 5;

BEST MODE FOR CARRYING OUT THE INVENTION

In the following, a wiring clip 1 as a wiring harness fixing device according to a preferred embodiment of the present invention will be explained with reference to FIGS. 1–6. The wiring clip 1 shown in FIG. 1 and so on fixes a wiring harness 2 to be mounted on a motor vehicle as a mobile unit on a panel 3 (shown in FIG. 3 and so on) of the motor vehicle.

Figure 3:
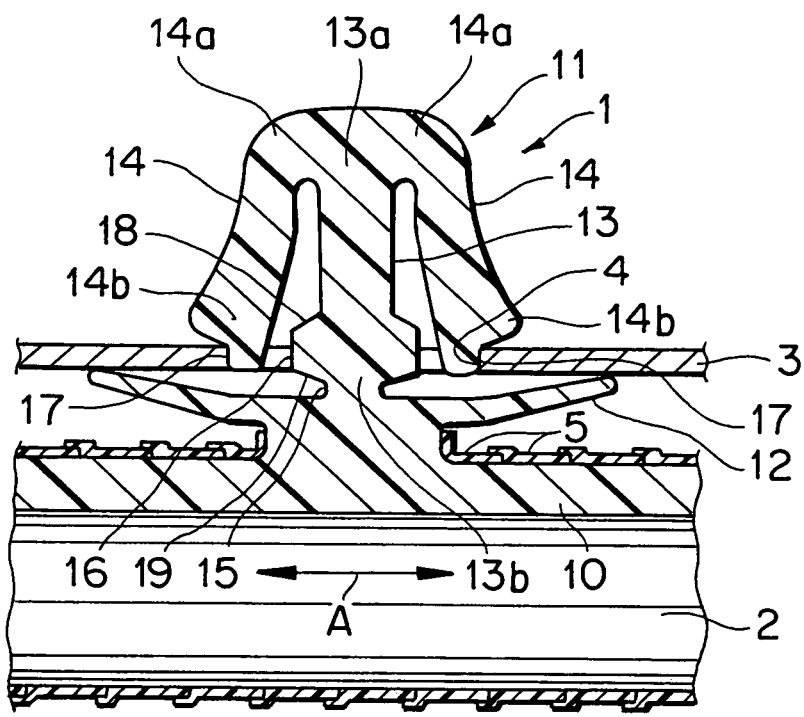
FIG. 3 is a cross-sectional view illustrating a state when the wiring clip shown in FIG. 1 fixes the wiring harness on a panel.
Figure 5:
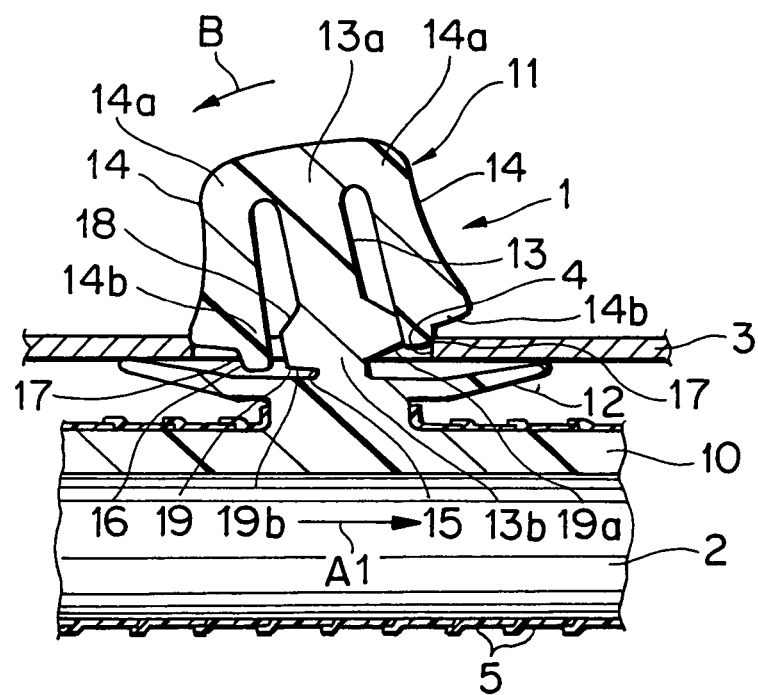
FIG. 5 is a cross-sectional view illustrating a state when an engaging part of the wiring clip is inclined from the state shown in FIG. 4.
Figure 7:
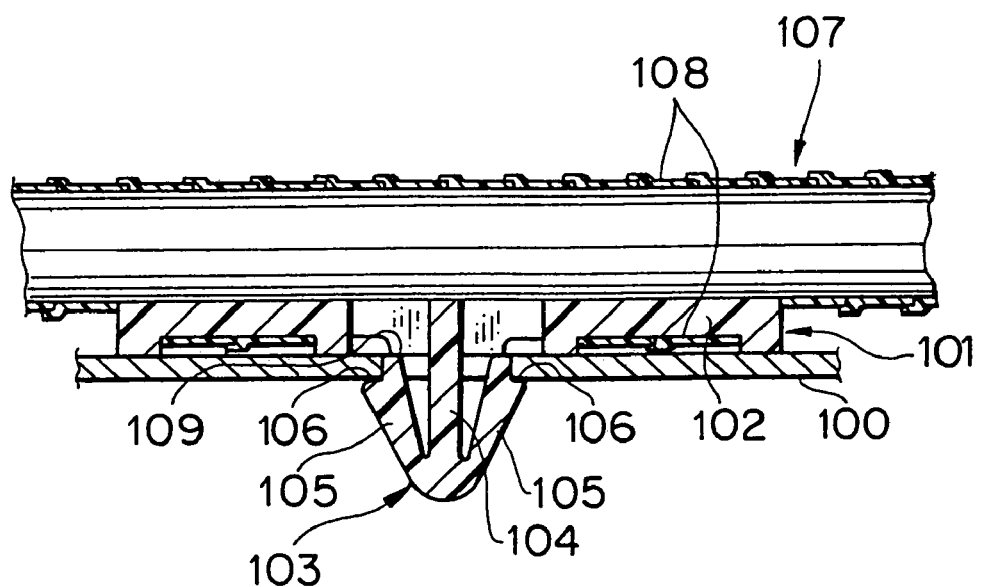
FIG. 7 is a cross-section view illustrating a state when a conventional wiring harness fixing device fixes a wiring harness on a panel.
Figure 8:
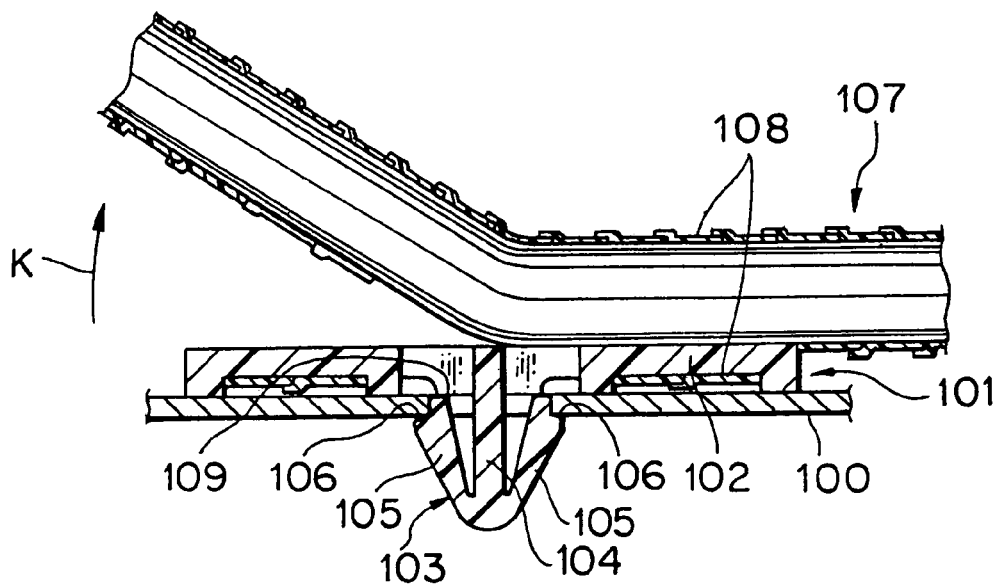
FIG. 8 is a cross-sectional view illustrating a state when an end of the wiring harness is separated from the wiring harness fixing device from the state shown in FIG. 7.
Figure 9:
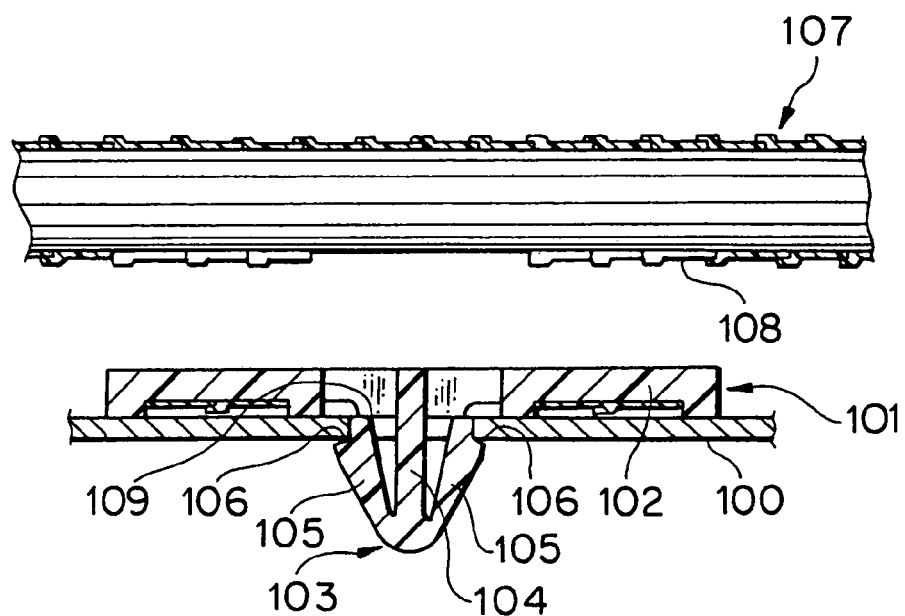
FIG. 9 is a cross-sectional view illustrating a state when the wiring harness is completely separated from the wiring harness fixing device from the state shown in FIG. 7.

The wiring harness 2 includes a plurality of electric wires (hereinafter, wires) and connectors attached to ends and so on of the wires. Each wire is a coated wire which includes an electrically conductive core wire and an electrically insulating coating that coats the core wire. Each connector includes electrically conductive terminal fittings and an insulating connector housing. Each terminal fitting is electrically connected to the core wire of the wire. The connector housing is formed in a box-shape and receives the terminal fittings therein. In the wiring harness 2, the connectors are coupled with mating connectors of various electronic instruments, thereby transmitting the electric power and various signals to the electronic instruments. The panel 3 constitutes a vehicle body of the motor vehicle. As shown in FIG. 3 and so on, the panel 3 is provided with a hole 4.

Figure 1:
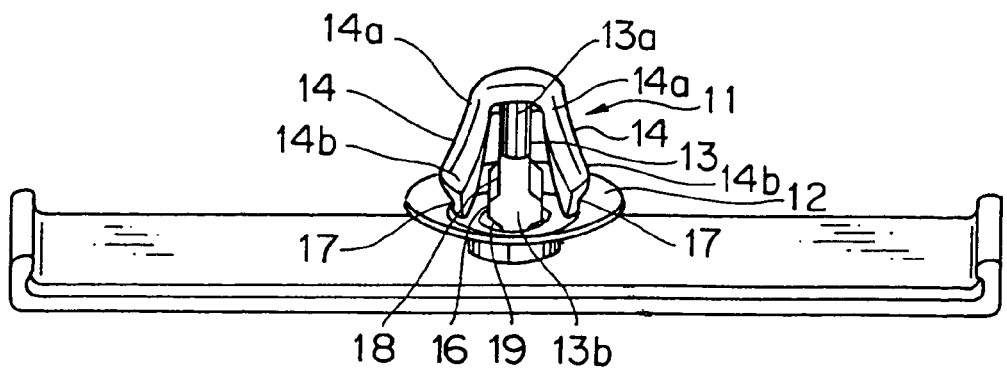
FIG. 1 is a perspective view of a wiring clip according to a preferred embodiment of the present invention.
Figure 2:
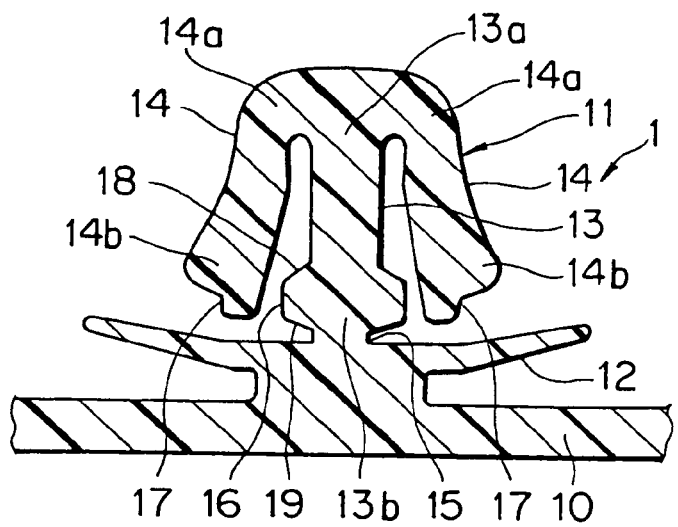
FIG. 2 is a cross-sectional view of a primary part of the wiring clip shown in FIG. 1.

As shown in FIGS. 1 and 2, the wiring clip 1 integrally includes a flat plate-shaped mount 10, engaging part 11 which engages with the hole 4, and support piece 12. The wiring clip 1 is made of synthetic resin. The mount 10 is formed in a band plate-shape. The mount 10 is put on wires of the wiring harness 2 and wound up by a tape 5 (shown in FIG. 3) together with the wires around the outer circumference thereof. The mount 10 is fixed to the wiring harness 2. The longitudinal direction of the mount 10 and a surface of the mount 10 is parallel to an extending direction (shown by an arrow A in FIG. 3) of the wiring harness 2. That is, the arrow A shows the longitudinal direction of the wires in the wiring harness 2.

The engaging part 11 stands up from the mount 10. The engaging part integrally includes a standing piece 13 which stands up from the mount 10, a pair of engaging pieces 14, a thin part 15, and a thick part 16 as the displacement means. The standing piece 13 extends from the mount 10 in a direction crossing a surface of the mount 10 at right angles.

One end 14a of the pair of the engaging pieces 14 continues to an end 13a of the standing piece 13 on the opposite side of the mount 10. That is, the end 13a is an end of the standing piece 13, which is situated on the opposite side of the mount 10. Opposite ends 14b of the pair of the engaging pieces 14 have a distance therebetween. Each end 14b has a distance from the standing piece 13.

The pair of the engaging pieces 14 gradually approaches toward the mount 10 as each engaging piece 14 extends from the end 14a to the opposite end 14b. The pair of the engaging pieces 14 gradually moves away from each other and gradually moves away from the standing piece 13 as each engaging piece 14 extends from the end 14a to the opposite end 14b. The pair of the engaging pieces 14 is formed in a mountain-shape viewed from the side thereof. The opposite end 14b is provided with a notch 17. The notch 17 is formed by notching an outer edge of the opposite end 14b. The pair of the engaging pieces 14 can be elastically deformed in a direction that the opposite ends 14b approaches toward each other.

The thin part 15 is provided at a base end 13b of the standing piece 13, which is situated on the side of the mount 10. The base end 13b is an end of the engaging part 11 on the side of the mount 10 and is also an end of the standing piece 13 on the side of the mount 10. The thin part 15 is formed concave from an outer surface of the standing piece 13. The cross-sectional area of the standing piece 13 taken along the surface of the mount 10 becomes minimum at the thin part 15.

That is, the cross-sectional area of the standing piece 13 taken along the arrow A in FIG. 3 becomes minimum at the thin part 15. That is, the cross-sectional area of the thin part 15 taken parallel to the surface of the mount 10 is smaller than the cross-sectional area of any other part of the standing piece 13 taken parallel to the surface of the mount 10. Thus, the cross-sectional area of the engaging part 11 taken along the arrow A becomes minimum at the thin part 15.

The thick part 16 is also provided at the base end 13b of the standing piece 13, which is situated on the side of the mount 10. The mount 10 is situated nearer to the thin part 15 than the thick part 16. That is, the thin part 15 is situated nearer to the mount 10 than the thick part 16 is situated near the mount 10. The thick part 16 protrudes from the outer surface of the standing piece 13 toward the outer direction of the standing piece 13. As described later on, when the mount 10 is displaced along the arrow A, the thick part 16 comes in contact with the opposite end 14b of one engaging piece 14. The thick part 16 includes a first inclined surface 18 and a second inclined surface 19.

The first inclined surface 18 is provided at an end of the thick part 16, which is situated on the opposite side of the mount 10. The first inclined surface 18 protrudes from the outer surface of the standing piece 13 toward the outer direction of the standing piece 13. The first inclined surface 18 is inclined in a direction that the first inclined surface 18 gradually approaches toward the outer surface of the standing piece 13 as the first inclined surface 18 moves away from the mount 10. The first inclined surface 18 is inclined to both the direction of the arrow A and a direction crossing the direction of the arrow A at right angles.

The second inclined surface 19 is provided at another end of the thick part 16, which is situated on the side of the mount 10. That is, the second inclined surface 19 is situated between the first inclined surface 18 and the thin part 15. The second inclined surface 19 protrudes from the outer surface of the standing piece 13 toward the outer direction of the standing piece 13. The second inclined surface 19 is inclined in a direction that the second inclined surface 19 gradually advances toward the outside of the standing piece 13 as the second inclined surface 19 moves away from the mount 10. The second inclined surface 19 is inclined to both the direction of the arrow A and a direction crossing the direction of the arrow A at right angles.

The support piece 12 is formed in a ring-shape. An inner edge of the support piece 12 continues to the base end 13b. The support piece 12 extends from the standing piece 13 toward the outer direction of the standing piece 13. The support piece 12 is slightly inclined to the surface of the mount 10 in a direction that the support piece 12 gradually moves away from the mount 10 as the support piece 12 extends from the inner edge thereof to the outer edge thereof.

As explained above, according to the invention, when the mount is displaced in the extending direction of the wiring harness, the displacement means displaces the engaging part in the direction of inclining the engaging part toward the mount. Then, the engaging part is broken from the thin part, at which the cross-sectional area of the engaging part is minimum. That is, the engaging part is cut at the thin part.

Then, the engaging part 11 is faced to the hole 4 of the panel 3. The engaging part 11 is inserted through the hole 4 from the one end 14a of the pair of the engaging pieces 14 and the end 13a of the standing piece 13. The pair of the engaging pieces 14 is once elastically deformed in a direction that the opposite ends 14b approach toward each other. Thereafter, when the opposite ends 14b of the pair of the engaging pieces 14 enter in the hole 14, the opposite ends 14b are displaced in a direction that the opposite ends 14b move away from each other by an elastic recovery force.

Then, the notch 17 comes in contact with the inner edge of the hole 4. The engaging part 11 is engaged with the hole 4 of the panel 3. Then, the outer edge of the support piece 12 comes in contact with the surface of the panel 3. Thus, as shown in FIG. 3, the wiring clip 1 fixes the wiring harness 2 on the panel 3.

Figure 4:
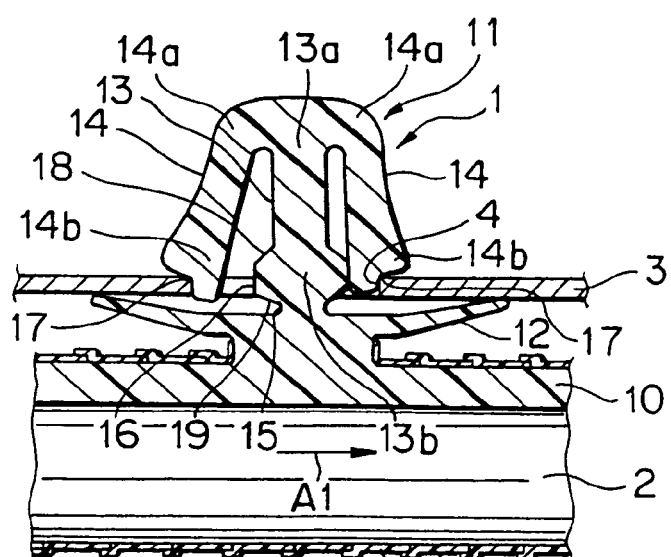
FIG. 4 is a cross-sectional view illustrating a state when a mount of the wiring clip is displaced along an arrow A1 from the state shown in FIG. 3.

The wiring harness 2, which is fixed on the panel 3 with the wiring clip 1, is removed from the panel 3 as follows. First, the wiring harness 2 is displaced, i.e. the mount 2 is displaced along a direction (i.e. the extending direction of the wiring harness 2) of the arrow A1 shown in FIG. 4. Then, as shown in FIG. 4, the thick part comes in contact with the opposite end 14b of one of the pair of the engaging pieces 14. Then, the opposite end 14b cannot approach toward the standing piece 13 any more. That is, the opposite end 14b does not approach the standing piece 13 to come in contact with the standing piece 13.

Since the first inclined surface 18 and the second inclined surface 19 are inclined as described above, as shown in FIG. 5, in a direction that the extending direction of the standing piece 13 is becoming parallel to the surface of the mount 10, the standing piece 13 is displaced (rotated), i.e. the engaging part 11 is displaced (rotated) along an arrow B (shown in FIG. 5) around the thin part 15. In this specification, that the standing piece 13 is displaced, i.e. the engaging part 11 is displaced around the thin part 15 in the direction (shown by the arrow B in FIG. 5) that the extending direction of the standing piece 13 is becoming parallel to the surface of the mount 10 means that the engaging part 11 is inclined toward the mount 10 around the thin part 15. Thus, when the mount 10 is displaced along the arrow A1, the thick part 16 displaces the engaging part 11 in a direction that the engaging part 11 is inclined toward the mount 10.

Then, a part (shown, by 19a in FIG. 5) of the second inclined surface 19 on the side of the one engaging piece 14 moves away from the support piece 12, while a part (shown by 19b in FIG. 5) of the second inclined surface 19 on the side of the opposite engaging piece 14 approaches toward the support piece 12. Then, since the thin part 15 has the minimum cross-sectional area in the standing piece 13, the standing piece 13 breaks from the one engaging piece 14-side of the thin part 15. Then, as shown in FIG. 6, the standing piece 13 is cut at the thin part 15, thereby the standing piece 13 and the pair of the engaging pieces 14 are separated from the mount 10. That is, the engaging part 11 is separated from the mount 10. Then, the wiring harness 2 together with the mount 10 can be removed from the panel 3.

According to the preferred embodiment, the thick part 16 protrudes from the outer surface of the standing piece 13 toward the outer direction of the standing piece 13. The first inclined surface 18 is inclined in a direction that the first inclined surface 18 gradually approaches toward the outer surface of the standing piece 13 as the first inclined surface 18 moves away from the mount 10. The second inclined surface 19 is inclined in a direction that the second inclined surface 19 gradually advances toward the outside of the standing piece 13 as the second inclined surface 19 moves away from the mount 10. The thin part 15 is situated nearer to the mount 10 than the thick part 16 is situated near the mount 10. The second inclined surface 19 is situated between the first inclined surface 18 and the thin part 15. Further, the thick part 16 is situated at a position where the thick part 16 comes in contact with the opposite end 14b of the one engaging piece 14.

When the mount 10 is displaced along the arrow A1, the opposite end 14b of the one engaging piece 14 comes in contact with the thick part 16 and does not come in contact with the standing piece 13. Therefore, being pushed by the opposite end 14b of the one engaging piece 14, the thick part 16 securely displaces the engaging part 11 in the direction (shown by the arrow B in FIG. 5) that the thick part 16 inclines the engaging part 11 toward the mount 10 around the thin part 15. Then, the standing piece 13 breaks at the thin part 15 that has the minimum cross-sectional area in the standing piece 13. That is, the engaging part 11 is cut at the thin part 15.

Thus, when the mount 10 is displaced along the arrow A1, the engaging part 11 is separated from the mount 10. That is, when the mount 10 is displaced along the arrow A1, the mount 10 and the wiring harness 2 can be removed from the panel 2. Therefore, the wiring harness 2 can be easily removed from the panel 3.

When the wiring harness 2 is removed from the panel 3, the mount 10 is also removed from the panel 3. Accordingly, the mount 10 can be recycled, thereby attaining the saving of resources.

INDUSTRIAL APPLICABILITY

As explained above, according to the invention described in claim 1, when the mount is displaced in the extending direction of the wiring harness, the displacement means displaces the engaging part in the direction of inclining the engaging part toward the mount. Then, the engaging part is broken from the thin part, at which the cross-sectional area of the engaging part is minimum. That is, the engaging part is cut at the thin part.

Thus, when the mount is displaced in the extending direction of the wiring harness, the engaging part is separated. Therefore, when the mount is displaced in the extending direction of the wiring harness, the mount and the wiring harness can be removed from the panel. That is, the wiring harness can be easily removed from the panel. When the wiring harness is removed from the panel, the mount is also removed from the panel. Therefore, the mount can be recycled, thereby attaining the saving of resources.

According to the invention, the thin part is situated nearer to the mount than the displacement means is situated near the mount. Therefore, when the displacement means inclines the engaging part toward the mount, the engaging part is securely broken from the mount. That is, when the mount is displaced in the extending direction of the wiring harness, the mount and the wiring harness can be securely removed from the panel. That is, the wiring harness can be easily removed from the panel. When the wiring harness is removed from the panel, the mount is also securely removed from the panel. Therefore, the mount can be recycled, thereby attaining the saving of resources.

According to the invention, the displacement means protrudes from the outer surface of the standing piece. Therefore, when the mount is displaced along the extending direction of the wiring harness, the engaging pieces do not approach the standing piece to come in contact with the standing piece. That is, the displacement means securely displaces the engaging part in the direction of inclining the engaging part.

Therefore, when the mount is displaced in the extending direction of the wiring harness, the mount and the wiring harness can be removed from the panel. That is, the wiring harness can be easily removed from the panel. When the wiring harness is removed from the panel, the mount is also securely removed from the panel. Therefore, the mount can be recycled, thereby attaining the saving of resources.

According to the invention, when the mount is displaced in the extending direction of the wiring harness, the displacement means displaces the engaging part in the direction of inclining the engaging part toward the mount. Then, the engaging part is broken from the thin part, at which the cross-sectional area of the engaging part is minimum. That is, the engaging part is cut at the thin part.

Therefore, when the mount is displaced in the extending direction of the wiring harness, the mount and the wiring harness can be more securely removed from the panel. That is, the wiring harness can be easily removed from the panel. When the wiring harness is removed from the panel, the mount is also more securely removed from the panel. Therefore, the mount can be recycled, thereby attaining the saving of resources.

According to the invention, the second inclined surface is situated nearer to the thin part than the first inclined surface is situated near the thin part. The second inclined surface is inclined in a direction of gradually advancing toward the outside of the standing piece as the second inclined surface moves away from the mount. Therefore, when the mount is displaced along the extending direction of the wiring harness, the displacement means more securely inclines the engaging part toward the mount.

Therefore, when the displacement means inclines the engaging part toward the mount, the engaging part is more securely broken from the mount. That is, when the mount is displaced in the extending direction of the wiring harness, the mount and the wiring harness can be more securely removed from the panel. That is, the wiring harness can be easily removed from the panel. When the wiring harness is removed from the panel, the mount is also more securely removed from the panel. Therefore, the mount can be recycled, thereby attaining the saving of resources.

What is claimed is:

1. A wiring harness fixing device for mounting a wiring harness on a panel that constitutes a body of a motor vehicle, comprising:
    a mount to be put on the wiring harness;
    an engaging part that stands up from the mount arranged to engage with a hole formed in the panel, said engaging part including a standing piece that has a thick part adjacent to a base of the standing piece on the mount;
    a concave thin part in the standing piece, thinner than the remainder of the standing piece, situated nearer to the mount than the thick part, and which is provided at an end of the engaging part on the side of the mount and has the smallest cross-sectional area in the standing piece of the engaging part, said cross-sectional area being taken along an extending direction of the wiring harness; and
    displacement means for displacing the engaging part in a direction of inclining towards the mount around the thin part of the standing piece when the mount is displaced along the extending direction of the wiring harness.

2. The wiring harness fixing device according to claim 1, wherein the displacement means is provided at the end of the engaging part on the side of the mount and the thin part of the standing piece is situated nearer to the mount than is the displacement means.

3. A wiring harness fixing device for mounting a wiring harness on a panel that constitutes a body of a motor vehicle, comprising:
    a mount to be put on the wiring harness;
    an engaging part, which stands up from the mount and can engage with a hole formed in the panel;
    a thin part, which is provided at an end of the engaging part on the side of the mount and has the smallest cross-sectional area in the engaging part, said cross-sectional area being taken along an extending direction of the wiring harness; and
    displacement means for displacing the engaging part in a direction of inclining towards the mount around the thin part when the mount is displaced along the extending direction of the wiring harness;
    wherein the displacement means is provided at the end of the engaging part on the side of the mount and the thin part is situated nearer to the mount than is the displacement means; and
    wherein the engaging part includes:
    a standing piece standing up from the mount; and
    a pair of engaging pieces, which engages with the hole formed in the panel, continues to an end of the standing piece on the opposite side of the mount, and is inclined in a direction away from each other as the pair of engaging pieces approaches toward the mount, wherein the thin part and the displacement means are provided at an end of the standing piece on the side of the mount, the thin part has the smallest cross-sectional area in the standing piece, said cross-sectional area being taken along an extending direction of the wiring harness, and the displacement means protrudes from an outer surface of the standing piece toward an outer direction of the standing piece.

4. The wiring harness fixing device according to claim 3, wherein the displacement means includes a first inclined surface, which protrudes from the outer surface of the standing piece toward the outer direction of the standing piece and is inclined in a direction of gradually approaching toward the outer surface of the standing piece as the first inclined surface moves away from the mount.

5. The wiring harness fixing device according to claim 4, wherein the displacement means includes a second inclined surface, which is provided between the first inclined surface and the thin part, wherein the second inclined surface protrudes from the outer surface of the standing piece toward the outer direction of the standing piece, and is inclined in a direction of gradually advancing toward the outside of the standing piece as the second inclined surface moves away from the mount.

* * * * *